US009294885B2

(12) United States Patent
Hegde

(10) Patent No.: US 9,294,885 B2
(45) Date of Patent: Mar. 22, 2016

(54) METHOD AND SYSTEM FOR SYSTEM INFORMATION ACQUISITION

(71) Applicant: TEJAS NETWORKS LIMITED, Bangalore (IN)

(72) Inventor: Rohith Vijayakumar Hegde, Bangalore (IN)

(73) Assignee: TEJAS NETWORKS LIMITED, Bangalore (IN)

( * ) Notice: Subject to any disclaimer, the term of this patent is extended or adjusted under 35 U.S.C. 154(b) by 55 days.

(21) Appl. No.: 14/227,430

(22) Filed: Mar. 27, 2014

(65) Prior Publication Data
US 2014/0293860 A1    Oct. 2, 2014

(30) Foreign Application Priority Data
Mar. 28, 2013  (IN) .......................... 1386/CHE/2013

(51) Int. Cl.
*H04W 4/06* (2009.01)
*H04L 1/00* (2006.01)
*H04W 72/12* (2009.01)
*H04W 48/12* (2009.01)

(52) U.S. Cl.
CPC . *H04W 4/06* (2013.01); *H04L 1/00* (2013.01); *H04W 48/12* (2013.01); *H04W 72/1289* (2013.01)

(58) Field of Classification Search
CPC ....... H04W 68/02; H04W 4/06; H04W 48/12; H04W 72/1289; H04L 1/00
See application file for complete search history.

(56) References Cited

U.S. PATENT DOCUMENTS

| 2009/0319903 A1* | 12/2009 | Alanara | H04W 72/1289 715/733 |
| 2011/0002258 A1* | 1/2011 | Du | H04W 48/08 370/315 |
| 2014/0050127 A1* | 2/2014 | Wang | H04B 7/0486 370/280 |

* cited by examiner

*Primary Examiner* — Chi H Pham
*Assistant Examiner* — Weibin Huang
(74) *Attorney, Agent, or Firm* — Barry Choobin; Patent 360 LLC

(57) ABSTRACT

The embodiments herein provide a method of acquiring a plurality of system information messages in a radio communication network. The method comprises the steps of overlapping a plurality of system information windows and acquiring the plurality of system information messages for which the system information window overlaps in the user equipment. The method of overlapping the system information windows comprises of transmitting system information scheduling configuration containing scheduling information list, calculating start sub-frame and start radio frame of the system information window for the system information messages from the scheduling information, determining occurrence of system information window overlap of the system information messages and acquiring a plurality of system information messages in the overlapped system information windows. The system information acquisition is performed until the plurality of system information messages in the overlapped system information widow is acquired.

9 Claims, 3 Drawing Sheets

METHOD AND SYSTEM FOR SYSTEM INFORMATION ACQUISITION

CROSS-REFERENCE TO RELATED APPLICATIONS

This application claims the priority and benefit of an Indian Non Provisional Patent Application (NPA) with serial number 1386/CBE/2013 filed on Mar. 28, 2013 and entitled, "METHOD AND SYSTEM FOR SYSTEM INFORMATION ACQUISITION" and the contents of the above application are included in its entirety herein at least by reference.

BACKGROUND

1. Technical field

The embodiments herein generally relate to the field of wireless communication and particularly relate to techniques of sending system information messages in wireless communication systems. The embodiments herein more particularly relates to a method of acquiring multiple system information messages in a single system information window without any ambiguity or loss of system information.

2. Description of the Related Art

The Long Term Evolution (LTE) is a new terrestrial mobile communication standard currently being standardized by the 3GPP. The Radio Access Network. (RAN) of LTE is named as the Evolved-Universal Mobile Telecommunication Systems Radio Access Network. (E-UTRAN). The E-UTRAN physical layer is based on Orthogonal Frequency Division Multiplexing (OFDM). More precisely; the downlink
transmission scheme is based on conventional. OFDM using a cyclic prefix while the uplink transmission is based on single carrier frequency division multiple access (SC-FDMA) techniques. The OFDM subcarrier spacing is 15 kHz in both uplink and downlink transmission. LTE supports both frequency division duplex (FDD) and time division duplex (TDD).

System Information (SI) in an LTE system is divided into a number of System Information Blocks (SIBs) and Master Information Block (MIB). The MIB includes limited number of most essential and frequently transmitted parameters to acquire other information from the cell. The SI is defined in TS 36.300 as a RRC message carrying a number of System Information Blocks (SIBs) that have the same periodicity. Each System Information Block (SIB) contains a set of related system information parameters. SystemInformationBlockType1 (SIB1) is transmitted alone, separately from other SI-messages. The MIB message is mapped on a Broadcast Control Channel (BCCH) and carried on Physical Broadcast Channel (PBCH). All other SI messages are carried on a Downlink Shared Channel (DL-SCH) where they can be identified through the SI-RNTI (System Information Radio Network; Temporary Identifier).

SIBs other than SIB1 are carried in SI messages and mapping of System Information Blocks to SI messages is flexibly configurable by using a scheduling Information parameter included in SIB1, with restrictions that each SIB is contained only in a single SI message. Only SIBs having the same scheduling (periodicity) requirement can be mapped to the same SI message. SystemInformationBlockType2 (SIB2) is always mapped to the SI message that corresponds to the first entry in the list of SI messages in the scheduling information parameter.

Multiple SI messages may be transmitted with the same periodicity. The MIB uses a fixed schedule with a periodicity of 40 ms and repetitions made within 40 ms. The first transmission of the MIB is scheduled in subframe #0 of radio frames for which the System Frame Number (SFN) mod 4=0 arid repetitions are scheduled in subframe #0 of all other radio frames. The SIB1 uses a fixed schedule with a periodicity of 80 ms and repetitions made within 80 ms. SIB1 is scheduled in subframe #5 of radio frames for which SFN mod 8=0 and repetitions are scheduled in subframe #5 of all other radio frames for which SFN mod 2=0.

The SI messages are transmitted with periodically occurring time domain windows (referred to as SI-windows) using a dynamic scheduling mechanism. Each. SI message is associated with a SI-window and the SI-windows of different SI messages do not overlap. That is, within one SI-window only the corresponding SI is transmitted. The length of the SI-window is common for all SI messages and is configurable. Within the SI-window, the corresponding SI message can be transmitted a number of times in any subframe other than sub-frames where SIB1 is present (i.e. subframe #5 of radio frames for which SFN mod 2=0), any uplink subframes in TDD and any MBSFN subframes, SIB1 configures the SI window length and the transmission periodicity for the SI messages. For TDD networks, SIB1 configures TDD configuration which includes subframe Assignment and special Subframe Configuration. SIB2 configures the MBSFN-Subframe Config which defines subframes that are reserved for MBSFN in downlink.

A user equipment (UE) acquires the detailed time-domain scheduling (and other information e.g. frequency-domain scheduling, information on the used transport format etc.) from decoding the SI-RNTI on Physical Downlink Control Channel (PDCCH). A single SI-RNTI is used to address SIB1 as well as other SI messages. The UE acquires SIB1 and other SI messages on the Physical Downlink Shared Channel (PD-SCH) resource indicated by decoding PDCCH.

Normally, in System Information (SI) message acquisition procedure, the UE acquires only one SI message in a SI window resulting in ambiguity and loss of System Information when SI windows of multiple SI messages overlap.

In view of the foregoing, there exists a need for an efficient method and system for acquiring multiple system information messages in a single system information window. There also exists a need for a method and system for providing flexibility in the scheduling of System Information messages. Further, there exists a need to provide a method and system for acquiring multiple system information messages in a single system information window without any ambiguity or loss of system information.

The above mentioned shortcomings, disadvantages and problems are addressed herein and which will be understood by reading and studying the following specification.

OBJECTS OF THE EMBODIMENTS

The primary objective of the embodiments herein is to provide a method and system for acquiring multiple system information messages in a single system information window.

Another objective of the embodiments herein is to provide a method and system for acquiring multiple system information messages in a single system information window without any ambiguity or loss of system information.

Another objective of the embodiments herein is to provide method and system for providing flexibility in the scheduling of System Information messages.

Another objective of the embodiments herein is to provide a method and system for increasing the number of SI messages which can be sent to the maximum limit without missing a transmission opportunity.

These and other objectives and advantages of the present disclosure will become readily apparent from the following detailed description taken in conjunction with the accompanying drawings.

SUMMARY

The various embodiments herein provide a method of acquiring a plurality of system information messages in user equipment. The method comprises the steps of overlapping a plurality of system information windows and acquiring the plurality of system information messages for which the system, information window overlaps in the user equipment.

According to an embodiment herein, overlapping a plurality of system information windows comprises of transmitting a. system information scheduling configuration containing a scheduling information list, calculating a start sub-frame number of the SI window for the system information messages from the scheduling information, calculating a start radio frame number of the SI window for the system information messages from the scheduling information, transmitting system information messages in the corresponding system information windows, determining an occurrence of a system information window overlap of the system information messages, transmitting the plurality of system information messages when system information windows overlap, calculating the number of system information overlapping in the system information windows and acquiring a plurality of system information messages in the overlapped system information windows. Here the system information acquisition is performed in the overlapped system information window until the pluralities of system information messages are acquired.

According to an embodiment herein, the scheduling information is transmitted by a network element.

According to an embodiment herein, the user equipment is adapted for acquiring the system information message for a single system information message mapped to one frame of the SI window and skips processing of the system information on other frames of the SI window, acquiring the plurality of system information messages mapped to one or more frames of the SI window when a plurality of system information messages are mapped to the SI window and skips processing of the system information on other frames of the SI window, acquiring the system information messages in the succeeding SI window for each of the system information messages, when the plurality of SI messages mapped to the SI window are not acquired until the last frame of the SI window and performing system information message acquisition until the defined system information messages are acquired.

According to an embodiment herein, the system information scheduling configuration is stored in a scheduling Info List information element in a SystemInformationBlockType1.

According to an embodiment herein, the start subframe of the SI window for the system information messages is calculated based on an order of entry in a list of system information messages and a system information window length.

According to an embodiment herein, the start radio frame of the SI window for the system information messages is calculated based on an order of entry in a list of system information messages, a system information window length and a system information periodicity.

The embodiments herein further provide a system for acquiring a plurality of system information messages through system information window overlap. The system comprises a network element adapted to broadcast a system information scheduling configuration, determine an occurrence of system information windows of the plurality of system information messages, determine an occurrence of overlap of system information windows of the plurality of system information messages, and broadcast the plurality of system information messages in one or more corresponding system information windows when system information windows overlap. The system further comprises a user equipment having at least one module adapted to receive and process the system information scheduling information, calculate a start subframe and a start radio frame number of the SI window from the system information scheduling information, determine an occurrence of system information windows of the plurality of system information message, acquire the system information messages in one or more corresponding system information windows and acquire a plurality of system information messages in the overlapped system information windows.

According to an embodiment herein, the network element broadcasts the System Information scheduling configuration in scheduling InfoList Information Element in a System Information BlockType1.

According to an embodiment herein, the user equipment performs acquisition of the system information from the overlapped system information window until all the system information messages mapped to the SI window is acquired.

According to an embodiment herein, the modules comprises at least one of processors, electronic devices, hardware devices, electronic components, logical circuits, memories, software codes, firmware codes or any combination thereof.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
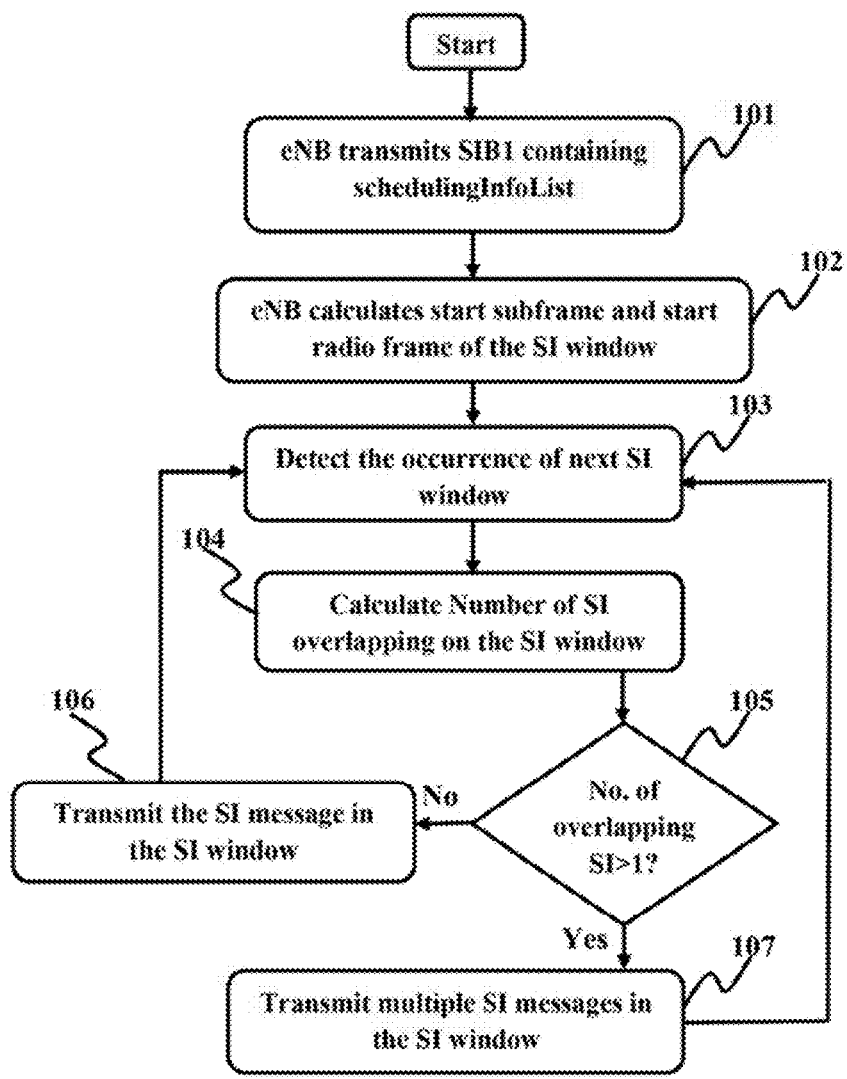
FIG. 1 is a flowchart illustrating a method of broadcasting the System Information scheduling configuration by the Base Station (eNB), according to an embodiment herein.

Although the specific features of the present disclosure are shown in some drawings and not in others. This is done for convenience only as each feature may be combined with any or all of the other features in accordance with the present disclosure.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in. the art to practice the embodiments and it is to be understood that the logical, mechanical and other changes may be made without departing from the scope of the embodiments. The following detailed description is therefore not to be taken in a limiting sense.

The various embodiments herein provide a method of acquiring a plurality of system information messages in user equipment. The method comprises the steps of overlapping a plurality of system information windows and acquiring the plurality of system information messages for which the system information window overlaps in the user equipment.

The method of overlapping a plurality of system information windows comprises of transmitting a system information scheduling configuration containing a. scheduling information list, calculating a start sub-frame number of the SI window for the system information messages from the scheduling information, calculating a start radio frame number of the SI window for the system information messages from the scheduling information, transmitting system information messages in the corresponding system information windows, determining an occurrence of a system information window overlap of the system information messages, transmitting the plurality of system information messages when system information windows overlap, calculating the number of system information overlapping in the system information windows and acquiring a plurality of system information messages in the overlapped system information windows. Here the system information acquisition is performed in the overlapped system information window until the pluralities of system information messages are acquired.

The scheduling information is transmitted by a network element. The system information scheduling configuration is stored in a scheduling InfoList information element in a SystemInformationBlockType1.

The equipment is adapted for acquiring the system information message for a single system information message mapped to one frame of the SI window and skips processing of the system information on other frames of the SI window, acquiring the plurality of system information messages mapped to one or more frames of the SI window when a plurality of system information messages are mapped, to the SI window and skips processing of the system information on other frames of the SI window, acquiring the system information messages in the succeeding SI window for each of the system information messages, when the plurality of SI messages mapped to the SI window are not acquired until the last frame of the SI window and performing system information message acquisition until the defined system information messages are acquired.

The start subframe of the SI window for the system information messages is calculated based on an order of entry in a list of system information messages and a system information window length.

The start radio frame of the SI window for the system information messages is calculated based on an order of entry in a list of system information messages, a system information window length and a system information periodicity.

FIG. 1 is a flowchart illustrating a method of broadcasting the System Information scheduling configuration by the Base Station (eNB), according to an embodiment herein. The method comprises: the Base Station (eNB) (Network Element Broadcasters) transmits SystemInformationBlockType1 (SIB1) containing scheduling infolist 101. The eNB calculates start subframe and start radio frame of the SI window for SI messages 102. After calculating the start subframe and start radio frame of the SI window for the System Information (SI) messages, the Base Station (eNB) (Network Element Broadcasters) detects the occurrences of the next SI window 103. The eNB calculates number of (multiple) SI overlapping on the SI window 104. The system then checks if one or more SI messages are overlapping or not at 105. If SI windows of multiple SI messages are overlapping, then the eNB transmits multiple SI messages in the same SI window 107. If SI windows of multiple SI messages are not overlapping, the eNB transmits only one SI message in the SI window 106. The eNB repeats this procedure to broadcast the system information.

Figure 2:
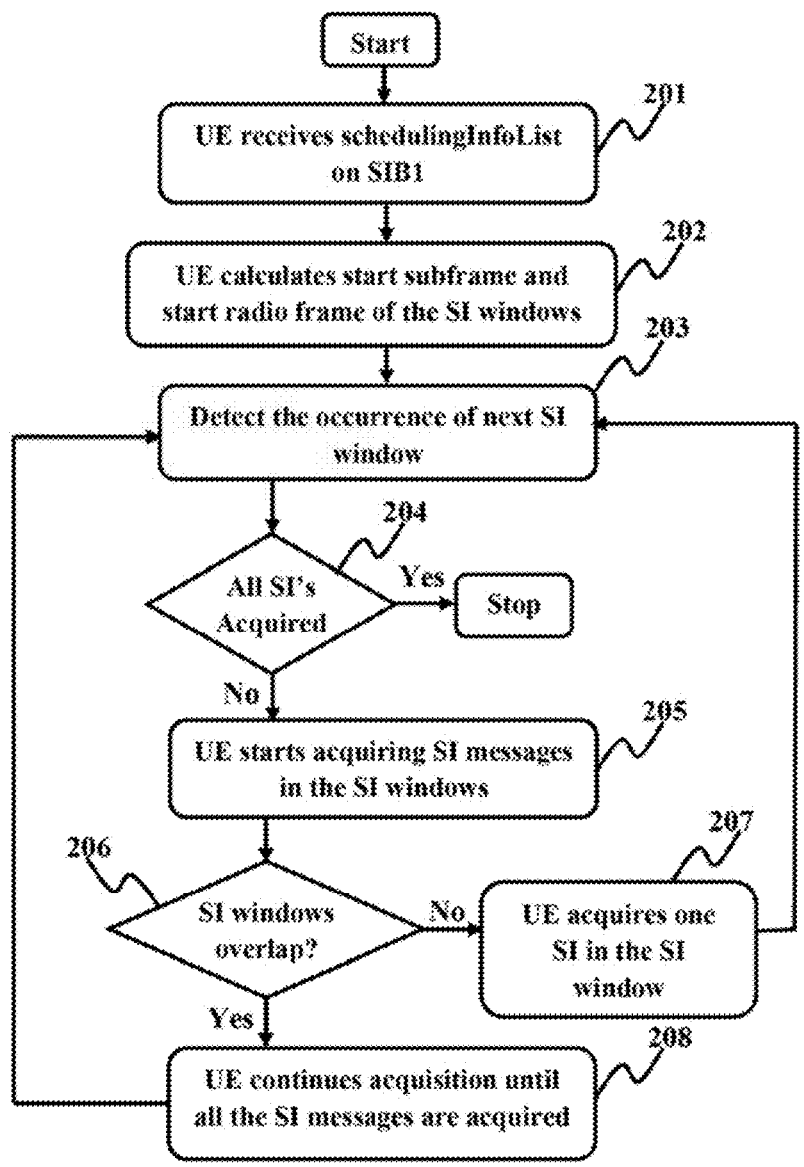
FIG. 2 is a flowchart illustrating a method of acquiring multiple system information messages in a radio communication network, according to an embodiment herein.

FIG. 2 is a flowchart illustrating a method of acquiring multiple system information messages in a single system information window, according to an embodiment herein. The network element broadcasts the System Information scheduling configuration in scheduling InfoList Information Element in SystemInformationBlockType1 (SIB1). The network element broadcasts the System Information messages in the corresponding System Information Windows. The User Equipment receives the scheduling InfoList Information Element in SystemInformationBlockType1 (SIB1) 201. The User Equipment calculates the start subframe and start radio frame of the System Information windows for the System Information messages 202. The User Equipment detects the occurrence of the next System Information Window 203 and checks if all the system information messages are acquired or not at 204. if all the SI messages are not acquired, the User Equipment acquires all the System Information messages in that System Information window 205. The user equipment further checks if the System Information windows of multiple System Information messages overlap or not at 206. If there is an overlap, the User Equipment continues System Information acquisition until all the System Information messages in that System Information window is acquired 208, Else the User Equipment acquires only one System Information message in the System Information Window 207. By acquiring multiple System Information messages in the overlapped System Information window, the User Equipment does not miss acquiring any System Information messages.

According to an embodiment herein, after calculating the start subframe and start radio frame of the SI window from the SI messages, the User Equipment (UE) determines if SI windows of multiple SI messages overlap. If SI windows of multiple SI messages overlap, the UE attempts to acquire all the SI messages in the SI window. Else the UE acquires only one SI message in the SI window. The UE repeats this procedure until all the SI messages have been acquired.

Figure 3:
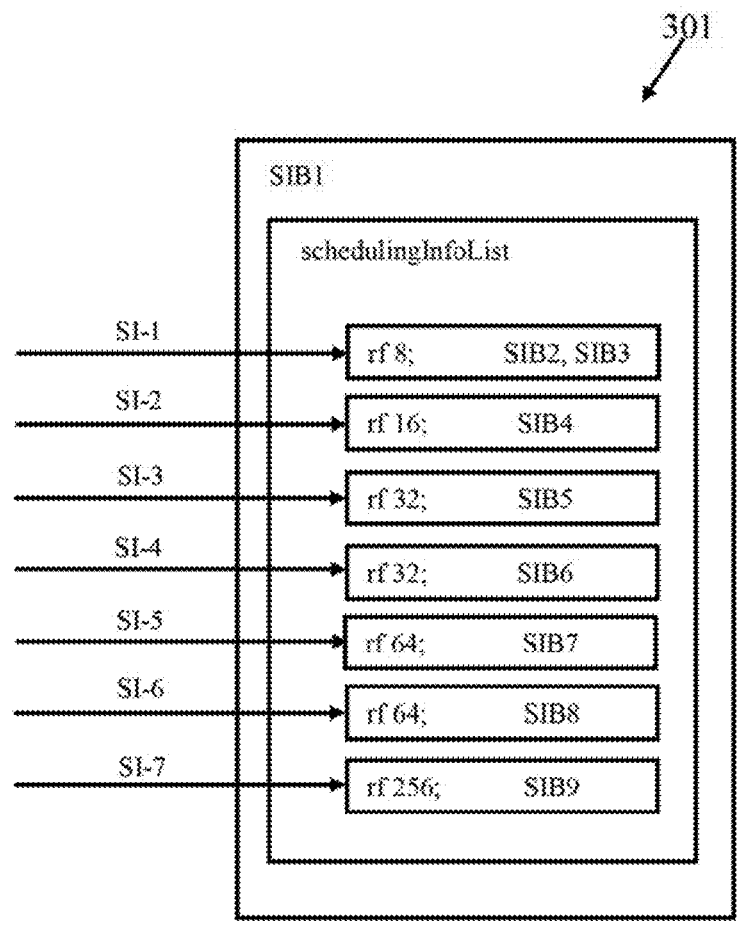
FIG. 3 is a table illustrating a sample of scheduling InfoList in SystemInformationBlockType1 (SIB1), according to an embodiment herein.

FIG. 3 is a table illustrating a sample of scheduling InfoList in SystemInformationBlockType1 (SIB1), according to an embodiment herein. The sample of scheduling InfoList in SystemInformationBlockType1 (SIB1) is as shown in the Table 301 in FIG. 3. The System Information (SI) message 1 record has a periodicity of rf8 (8 radio frames—80 ms) and SIB2, SIB3 are mapped to SI message1.

The various embodiments herein enable acquiring a plurality of system information messages in a user equipment. The solution of the embodiments herein provides flexibility in the scheduling of the system information messages. The solution of the embodiments herein solves the ambiguity and overcomes the loss of System Information when SI-Windows of multiple SI messages overlap.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the disclosure with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

I claim:

1. A method of acquiring a plurality of System Information (SI) messages in a radio communication network, the, method comprises the steps of:
   transmitting a system information scheduling configuration containing a scheduling information list;
   calculating a start sub-frame number of the System Information window for the system information messages from the scheduling information;
   calculating a start radio frame number of the System Information window for the system information messages from the scheduling information;
   transmitting system information messages in the corresponding System Information windows;
   determining an occurrence of a System Information window overlap of the System Information messages;
   transmitting the System Information messages when system information windows overlap;
   calculating the number of system information messages overlapping in the system information windows; and
   acquiring system information messages from the overlapped system information windows; and
   acquiring the system information messages for which the system information window overlaps in the user equipment.

2. The method of claim 1, the scheduling information is transmitted by a network element.

3. The method of claim 1, wherein the user equipment is adapted for:
   acquiring the system information message for a single system information message mapped to the SI window and skipping acquisition of the system information on other instances of the SI window;
   acquiring system information messages mapped to one or more frames of the SI window when a plurality of system information messages are mapped to the SI window and skips acquisition of the system information on other instances of the SI window;
   acquiring the system information messages in the succeeding SI window for each of the system information messages, when the plurality of SI messages mapped to the SI window are not acquired until the end of the SI window: and
   performing system information message acquisition until the required system information messages are acquired.

4. The method of claim 1, wherein the system information scheduling configuration is stored in a scheduling Info-List information element in a System Information BlockType 1.

5. The method of claim 1, wherein the start sub frame of the System Information window for the system information messages is calculated based on an order of entry in a list of system information messages and a system information window length.

6. The method of claim 1, wherein the start radio frame of the System Information window of the system information messages is calculated based on an order of entry in a list of system information messages a system information window length and a system information periodicity.

7. A System for acquiring a plurality of system information messages through system information window overlap, the system comprising:
   a network element adapted to:
      broadcast a system information scheduhng configuration;
      determine an occurrence of system information windows of the plurality of system information messages;
      broadcast the system information messages in the corresponding system information windows;
      determine occurrence of an overlap of the system information window's the plurality of system information messages;
      broadcast the plurality of system information messages when the system information window's overlap;
   a user equipment having at least one module adapted to:
      receive and process the system information scheduling information;
      calculate a start sub frame and a start radio frame number of the System Information window from the system information scheduling information determine an occurrence of system information windows of the plurality of system information messages; and
      acquire the system information messages in one or more corresponding system information window's; and
      acquire a plurality of system information messages in the overlapped system information windows.

8. The system of claim 7, wherein the network element broadcasts the System Information scheduling configuration in scheduling InfoList Information Element in a System Information BlockType 1.

9. The system of claim 7, wherein the user equipment performs acquisition of the system information messages from the overlapped system information windows until all the required system information messages mapped to the SI window is acquired.

* * * * *